United States Patent [19]
Nakamura

[11] Patent Number: 5,706,187
[45] Date of Patent: Jan. 6, 1998

[54] SWITCHING POWER SOURCE CIRCUITRY HAVING A CURRENT BYPASS CIRCUIT

[75] Inventor: Hidetake Nakamura, Tokyo, Japan

[73] Assignee: NEC Corporation, Tokyo, Japan

[21] Appl. No.: 545,329

[22] Filed: Oct. 19, 1995

[30] Foreign Application Priority Data

Oct. 21, 1994 [JP] Japan ................... 6-257090

[51] Int. Cl.$^6$ ............................... H02H 7/122
[52] U.S. Cl. .......................... 363/55; 363/20
[58] Field of Search .................... 363/16, 20, 21, 363/55, 56; 361/18

[56] References Cited

U.S. PATENT DOCUMENTS

| | | | |
|---|---|---|---|
| 4,002,959 | 1/1977 | Schadlich et al. | 318/245 |
| 4,010,342 | 3/1977 | Austin | 219/10.49 |
| 4,054,830 | 10/1977 | Harrel | 361/18 X |
| 5,014,177 | 5/1991 | Nuechterlein | 363/45 |

Primary Examiner—Peter S. Wong
Assistant Examiner—Y. J. Han
Attorney, Agent, or Firm—Scully, Scott, Murphy & Presser

[57] ABSTRACT

Power source circuitry is disclosed and has a DC power source and a switching circuit positioned at the primary side, a diode and a coil positioned at the secondary side and serially connected to a load, and a capacitor connected in parallel to the load. A current bypass circuit is connected in parallel to the load, and operates when a voltage applied to the load momentarily increases. When a current flowing through a load sharply decreases, the current bypass circuit conducts an abnormal current to be input to the load to the negative side. This suppresses the momentary increase in the voltage applied to the load. In a normal condition, no potential differences occur between the base and the emitter of a transistor, so that the transistor remains in an OFF state and prevents a current from flowing through the bypass circuit.

6 Claims, 4 Drawing Sheets

SWITCHING POWER SOURCE CIRCUITRY HAVING A CURRENT BYPASS CIRCUIT

BACKGROUND OF THE INVENTION

The present invention relates to power source circuitry and, more particularly, to a DC/DC converter capable of effectively suppressing the fluctuation of a voltage attributable to the fluctuation of a load and thereby outputting a stable DC output.

It has been customary to implement power source circuitry as forward type switching power source circuitry. This type of power source circuitry is constructed to switch a DC power source with a transistor or similar switching element, and to output the switched DC voltage via a transformer. However, the problem with the conventional circuitry is that when a load current is momentarily shut off by some cause, a surge voltage is generated at both ends of the load and adversely effects the load. To absorb the surge voltage, it is a common practice to use a capacitor having a great capacity.

However, a capacitor having a great capacity brings about the following problems, depending on the kind. A film capacitor, for example, cannot attain a sufficient capacity without having its size increased to an impractical degree. As for a capacitor produced by the electrolysis of aluminum, although a sufficient capacity is achievable for a unit volume, the service life and, therefore, reliability is short. For these reasons, a ceramic capacitor is predominant today. However, a ceramic capacitor is expensive particularly when the required capacity is great, resulting in an increase in production cost.

SUMMARY OF THE INVENTION

It is, therefore, an object of the present invention to provide power source circuitry capable of effectively suppressing a change in an output voltage attributable to a sharp change in a load without resorting to an expensive ceramic capacitor.

Power source circuitry of the present invention has a DC power source and a switching circuit positioned at the primary side, a diode and a coil positioned at the secondary side and serially connected to a load, and a capacitor connected in parallel to the load. A current bypass circuit is connected in parallel to the load, and operates when a voltage applied to the load momentarily increases.

When the entire apparatus in which the circuitry is built is operated, a switching circuit is repeatedly turned on and turned off. As a result, a current is intermittently fed from a DC power source to the primary winding of a transformer. In response, the transformer produces a voltage corresponding to its transformation ratio on the secondary winding. When the switching circuit is turned on, a current flows from the transformer to the secondary winding of the same via the diode, coil, and load. When the switching circuit is turned off, a current flows from the coil to the same via the load and diode.

If the load is abruptly reduced to zero ampere as when it is momentarily opened, a current having flown through the coil tends to flow continuously therethrough. As a result, the potential difference between opposite ends of the load tends to increase for a moment. Then, the current bypass circuit operates immediately and conducts an abnormal current to flow into the load to the negative side. This successfully suppresses the application of a sharp voltage to the load.

Further, in a normal condition, no potential differences occur between the base and the emitter of a transistor of the current bypass circuit. Hence, the transistor remains in its OFF state and causes no currents to flow through the current bypass circuit. The constituent parts of the bypass circuit can be implemented by ordinary inexpensive parts.

BRIEF DESCRIPTION OF THE DRAWINGS

The above and other objects, features and advantages of the present invention will become more apparent from the following detailed description taken with the accompanying drawings in which.

DETAILED DESCRIPTION OF THE PREFERRED EMBODIMENT

Figure 1:
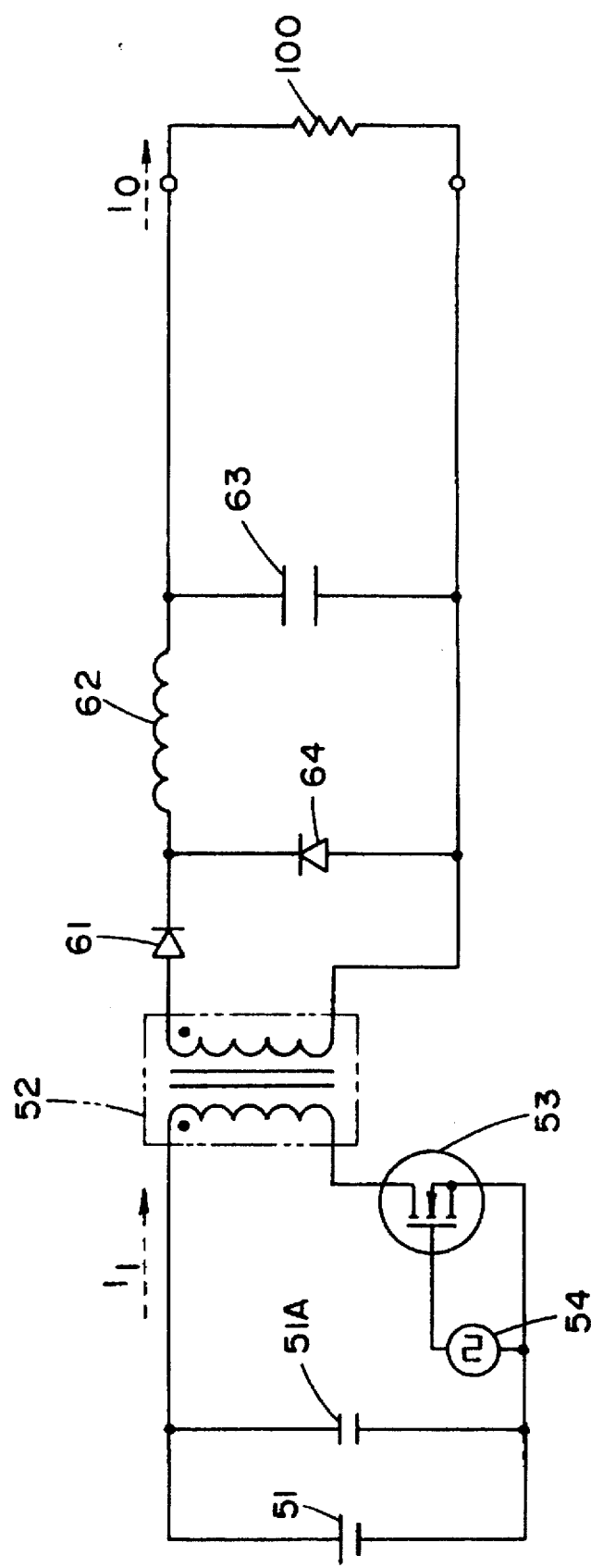
FIG. 1 is a circuit diagram showing conventional switching power source circuitry.

To better understand the present invention, a brief reference will be made to conventional forward type switching power source circuitry, shown in FIG. 1. As shown, the circuitry has a MOS FET (Metal-Oxide Semiconductor Field-Effect Transistor) 53. The MOS FET 53 is repeatedly turned on and turned off by a square wave generated by an oscillator 54. As a result, a current $I_1$ from a DC power source 51 is intermittently fed to the primary winding of a transformer 52. In response, the transformer 52 outputs a voltage determined by its transformation ratio on the secondary winding.

When the MOS FET 53 is turned on, a current flows from the transformer 52 to the secondary winding of the same by way of a diode 61, a coil 62 and a load 100. When the MOS FET 53 is turned off, a current flows from the coil 62 to the same by way of the load 100 and a diode 64.

Figure 2:
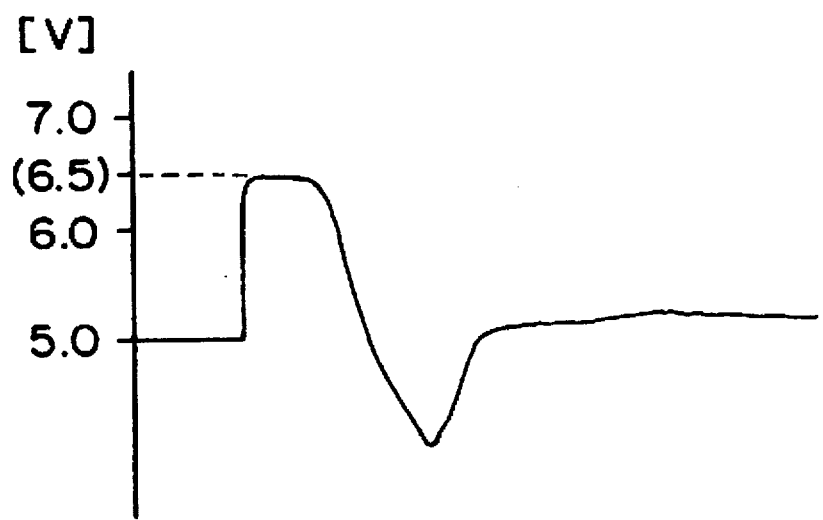
FIG. 2 is a graph showing how a momentary voltage rises in the circuitry of FIG. 1.

The above conventional circuitry has the following problem. Assume that the load current is abruptly reduced to zero ampere as when the load 100 is momentarily opened. Then, a current $I_0$ having flown through the coil 62 tends to flow continuously therethrough. Consequently, the potentials at opposite ends of the load 100 increase for a moment (generation of a surge voltage), as shown in FIG. 2. The surge voltage acts on the load 100 as a load and causes it to malfunction. If a capacitor 63 has a sufficient capacity, it will absorb the surge voltage and will thereby suppress the increase of momentary voltage, as discussed earlier. However, the capacitor 63 having such a capacity brings about the previously stated problems.

Figure 3:
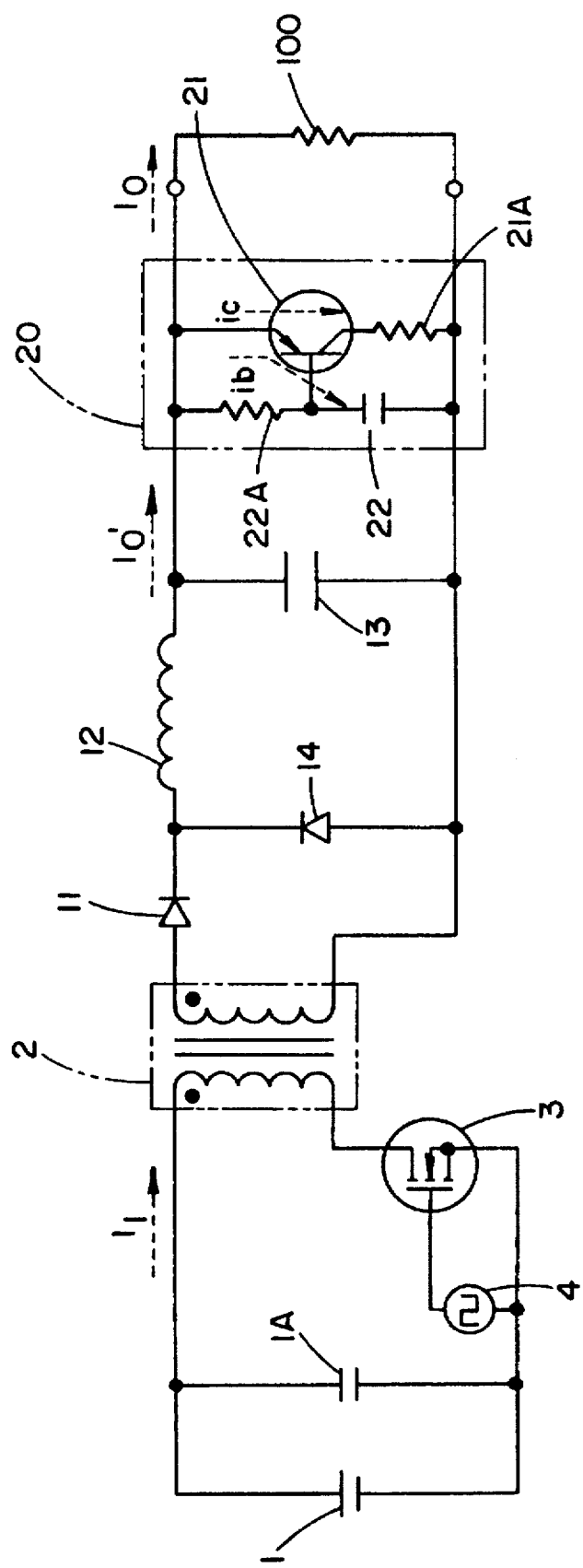
FIG. 3 is a circuit diagram showing switching power source circuitry embodying the present invention.

Referring to FIG. 3, switching power source circuitry embodying the present invention will be described. As shown, the circuitry feeds predetermined power to a load 100 via a transformer 2. The primary winding of the transformer 2 is connected to a DC power Source 1 and a MOS FET or switching element 3. The MOS FET 3 is repeatedly turned on and turned off by an oscillator 4. A capacitor 1A is connected in parallel to the DC power source 1. The secondary winding of the transformer 2 is connected to the load 100 via a serial connection of a diode 11 and a coil 12. A capacitor 13 is connected in parallel to the load 100. A diode 14 is connected in parallel to the serial connection of the coil 12 and capacitor 13.

Further, a current bypass circuit 20 is connected in parallel to the load 100 and functions when the voltage applied to the load 100 rises for a moment. The current bypass circuit 20 includes a p-n-p transistor 21 and a capacitor 22 determining the operation point of the transistor 21. Specifically, the circuit 20 is made up of a serial connection of the p-n-p transistor 21 and a resistor 21A, and a serial connection of the capacitor 22 and a resistor 22A. The transistor 21 has its base connected to the charging side of the capacitor 22.

In operation, as the MOS FET 3 is repeatedly turned on and turned off by a square wave generated by the oscillator 4, a current $I_1$ is intermittently fed from the DC power source 1 to the primary winding of the transformer 2. In response, the transformer 2 produces a voltage corresponding to its transformation ratio on the secondary winding. Specifically, when the MOS FET 3 is turned on, a current flows from the transformer 2 to the secondary winding of the same via the diode 11, coil 12, and load 100. When the MOS FET 3 is turned off, a current flows from the coil 12 to the same via the load 100 and diode 14.

In the current bypass circuit 20, the capacitor 22 is usually charged up to a voltage equivalent to a potential on opposite ends of the load 100 via the resistor 22A. In this condition, the p-n-p transistor 21 is continuously turned off.

Figure 4:
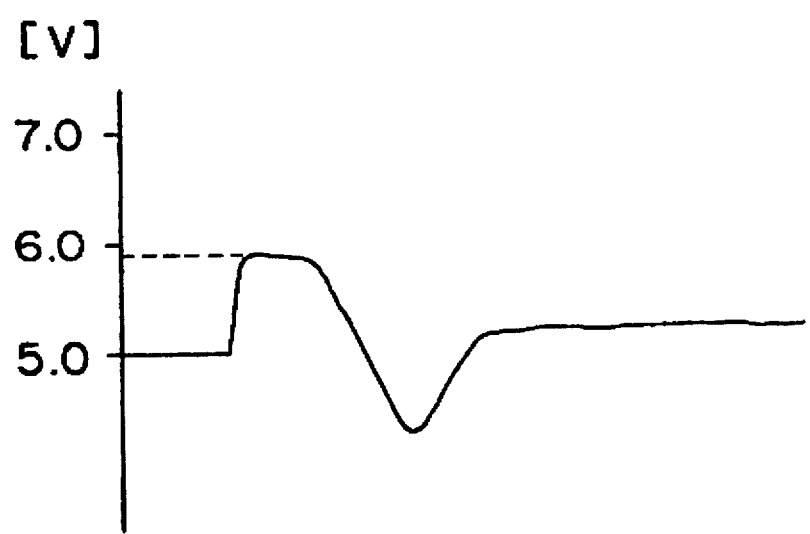
FIG. 4 is a graph showing how a momentary voltage rises in the embodiment.

Assume that the rated load current is 12 amperes, and that it constantly flows through the above circuitry. Then, if the load 100 is abruptly reduced to zero ampere as when it is momentarily opened, a current $I_0$ having flown through the coil 12 tends to flow continuously therethrough. As a result, the potential difference between opposite ends of the load 100 tends to increase for a moment. Hence, a momentary potential difference occurs between the emitter and the base of the transistor 21 and causes a base current $i_b$ to flow. The base current $i_b$ turns on the transistor 21 with the result that a collector current $i_c$ flows. In this manner, the current $I_0$ tending to flow continuously is transformed to the collector current $i_c$. This successfully suppresses the momentary increase in voltage, as shown in FIG. 4. In the above condition, the resistor 21A serves to limit the collector current $i_c$.

In the normal condition, no potential differences occur between the base and the emitter of the transistor 21, as stated earlier. Hence, the transistor 21 remains in its OFF state and causes no currents to flow through the current bypass circuit 20. The constituent parts of the bypass circuit 20 can be implemented by ordinary inexpensive parts.

While the present invention has been described in connection with a certain preferred embodiment, it is to be understood that the subject manner encompassed by the present invention is not limited to those specific embodiments. On the contrary, it is intended for the subject matter of the present invention to include all alternatives, modifications and equivalents as can be included within the spirit and scope of the following claims.

What is claimed is:

1. Power source circuitry comprising:

a DC power source and a switching circuit positioned at a primary side of a transformer;

a diode and a coil positioned at a secondary side of said transformer and serially connected to a load;

a first capacitor connected in parallel to said load; and a current bypass circuit connected in parallel to said load, and operating when a voltage applied to said load momentarily increases, said current bypass circuit comprising second capacitor which is charqed to a voltaqe that follows a load voltage across said load.

2. Circuitry as claimed in claim 1, wherein said current bypass circuit further comprises a switching transistor, said second capacitor determining an operating point of said switching transistor.

3. Circuitry as claimed in claim 1, wherein said current bypass circuit comprises a serial connection of a p-n-p transistor and a first resistor, and a serial connection of a second resistor and said second capacitor, and wherein a base of said p-n-p transistor is connected to a charging side of said second capacitor.

4. A DC/DC converter comprising a current bypass circuit connected in parallel to a load, and operating when an abnormal voltage is generated, said current bypass circuit comprising a capacitor which is charqed to a voltage that follows a load voltaqe across said load.

5. A DC/DC converter as claimed in claim 4, wherein said current bypass circuit further comprises a switching transistor, and wherein said capacitor determines an operating point of said switching transistor.

6. A DC/DC converter as claimed in claim 4, wherein said current bypass circuit comprises a serial connection of a p-n-p transistor and a first resistor, and a serial connection of a second resistor and said capacitor, and wherein a base of said p-n-p transistor is connected to a charging side of said capacitor.

* * * * *